(12) United States Patent
Evans

(10) Patent No.: US 7,045,975 B2
(45) Date of Patent: May 16, 2006

(54) APPARATUS AND METHODS FOR PROVIDING EMERGENCY SAFETY LIGHTING

(75) Inventor: Donald F. Evans, Pinehurst, NC (US)

(73) Assignee: Cyberlux Corporation, Durham, NC (US)

( * ) Notice: Subject to any disclaimer, the term of this patent is extended or adjusted under 35 U.S.C. 154(b) by 13 days.

(21) Appl. No.: 10/965,672

(22) Filed: Oct. 14, 2004

(65) Prior Publication Data

US 2005/0135103 A1   Jun. 23, 2005

Related U.S. Application Data

(60) Provisional application No. 60/510,915, filed on Oct. 14, 2003.

(51) Int. Cl.
*F21V 33/00* (2006.01)

(52) U.S. Cl. ............. 315/312; 315/149; 315/150; 315/159; 362/276

(58) Field of Classification Search ........... 315/312
See application file for complete search history.

(56) References Cited

U.S. PATENT DOCUMENTS

| | | | |
|---|---|---|---|
| 864,561 A | 8/1907 | Roby | |
| 3,739,226 A * | 6/1973 | Seiter et al. | 315/86 |
| 4,000,405 A | 12/1976 | Horwinski | |
| 4,255,780 A | 3/1981 | Sakellaris | |
| 4,755,913 A | 7/1988 | Sleveland | |
| 4,947,291 A | 8/1990 | McDermott | |
| 5,473,517 A | 12/1995 | Blackman | |
| 5,481,442 A | 1/1996 | Dickie et al. | |
| 5,495,402 A | 2/1996 | Houssian | |
| 5,637,930 A | 6/1997 | Rowen et al. | |
| 5,670,776 A | 9/1997 | Rothbaum | |
| 5,683,166 A | 11/1997 | Lutzker | |
| D387,650 S | 12/1997 | Lutzker | |
| D390,774 S | 2/1998 | Lutzker | |

(Continued)

OTHER PUBLICATIONS

Norman Mitchell; Technical Systems Company (TekSyCo); Faxed Copy of Trade Publication; Additional Information is Unavailable.

(Continued)

*Primary Examiner*—Trinh V. Dinh
*Assistant Examiner*—Binh Van Ho
(74) *Attorney, Agent, or Firm*—Alston & Bird LLP

(57) ABSTRACT

The present invention transforms existing electrical wall outlets into an emergency lighting system for homes, hospitals, hotels, nursing homes and businesses. The lighting device, designed as a replacement electrical wall outlet or receptacle, simply plugs into an existing dual outlet after removal of its faceplate. The lighting device continues to function as an electrical outlet, however, also comprises a local power source such as a constant charge lithium ion battery; a motion sensor for initiating a low level of lighting for darkened room or corridor transit; a power sensor for activating a high level of light when electrical service is disrupted, thereby broadcasting a wash of light over an otherwise darkened room or corridor; and a photoelectric cell which detects daylight or otherwise provided lighting of the room or corridor and thereby prevent unnecessary power usage.

21 Claims, 6 Drawing Sheets

U.S. PATENT DOCUMENTS

| | | |
|---|---|---|
| 5,806,961 A | 9/1998 | Dalton et al. |
| 5,813,752 A | 9/1998 | Singer et al. |
| 5,813,753 A | 9/1998 | Vriens et al. |
| 5,833,350 A | 11/1998 | Moreland |
| 6,000,807 A | 12/1999 | Moreland |
| 6,109,959 A | 8/2000 | Burlinson et al. |
| D433,954 S | 11/2000 | Delsart |
| 6,155,880 A * | 12/2000 | Yu .................. 439/652 |
| D464,865 S | 10/2002 | Luu |
| D469,339 S | 1/2003 | Luu |
| 6,648,496 B1 | 11/2003 | Elghoroury et al. |
| 2001/0046130 A1 * | 11/2001 | Cunningham et al. ........ 362/95 |
| 2003/0137258 A1 | 7/2003 | Piepgras et al. |
| 2004/0142601 A1 * | 7/2004 | Luu .......................... 439/652 |

OTHER PUBLICATIONS

*K-Tronik Ballasis —What's New*, available at http://www.ktronik/bizland.com/whatsnew.htm (Feb. 1, 2006), 3 pages.

\* cited by examiner

APPARATUS AND METHODS FOR PROVIDING EMERGENCY SAFETY LIGHTING

CROSS-REFERENCE TO RELATED APPLICATIONS

The present application claims priority to U.S. Provisional Application. No. 60/510,915 filed Oct. 14, 2003; the contents of which are incorporated herein in their entirety.

FIELD OF THE INVENTION

The present invention relates generally to the field of illumination and, more particularly, the invention relates to a solid state lighting source such as a light-emitting diode (LED) device that provides for multi-level, motion sensitive illumination in emergency situations.

BACKGROUND OF THE INVENTION

Frequently, homes, offices and industrial plant facilities experience many types of emergency situations involving power failures where an interior or exterior area has no light. Such power failures may result from electrical short circuits, brownouts, fire, accidents, natural disasters (i.e., floods, hurricanes, tornados, etc.) or a planned shutdown of electricity within a facility or dwelling. Many facilities, and especially residential homes, do not have emergency generators to provide temporary backup lighting in such situations and thus are limited to nominal emergency lighting in the form of portable light sources, such as flashlights or lanterns.

Accordingly, a need exists to provide a device for automatic, high-level illumination that is capable of immediate activation in response to a disruption of power. In such emergency situations, it is desirable for the illuminating device to be efficiently powered by a single battery pack, such that it is capable of constant high-level illumination lasting for several days or even weeks. Further, the illuminating device should provide a low-level illumination in response to local motion so as to facilitate the non-emergency transit of a darkened room or corridor. Finally, the illuminating device should be responsive to ambient light such that the above high and low-level illuminations do not occur in daylight or otherwise externally lighted rooms.

BRIEF SUMMARY OF THE INVENTION

The present invention transforms existing electrical wall outlets into an emergency lighting system for homes, hospitals, hotels, nursing homes and businesses. The lighting device, designed as a replacement electrical wall outlet or receptacle, simply plugs into an existing wall outlet. Alternatively, the device may provide a stand-alone unit that replaces a conventional wall outlet receptacle altogether. In either case, the lighting device continues to function as an electrical outlet; however, the device also comprises a local power source such as a constant charge lithium ion battery; a motion sensor for initiating a low level of lighting for transiting a darkened room or corridor; a power sensor for activating a high level of light when electrical service is disrupted, thereby broadcasting a wash of light over an otherwise darkened room or corridor; and a photoelectric cell which detects daylight or otherwise externally provided lighting of a room or corridor thereby preventing unnecessary power usage.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Figure 2:
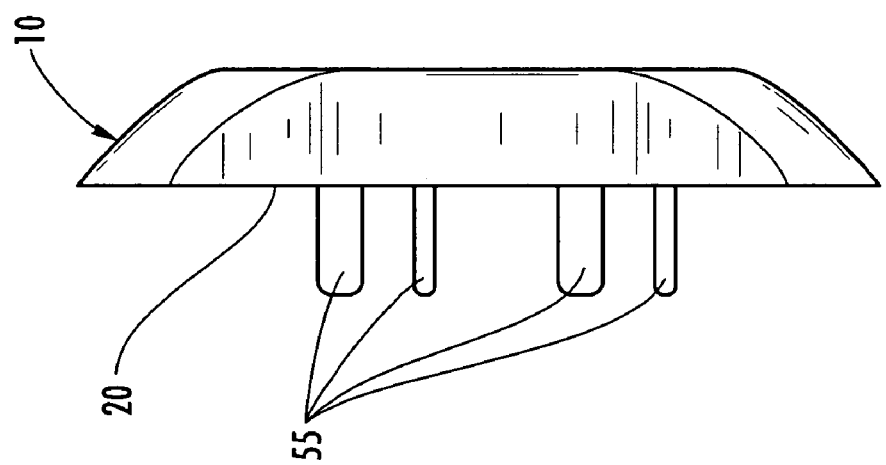
FIG. 2 illustrates a side view of an emergency lighting device, in accordance with an embodiment of the present invention.
Figure 1:
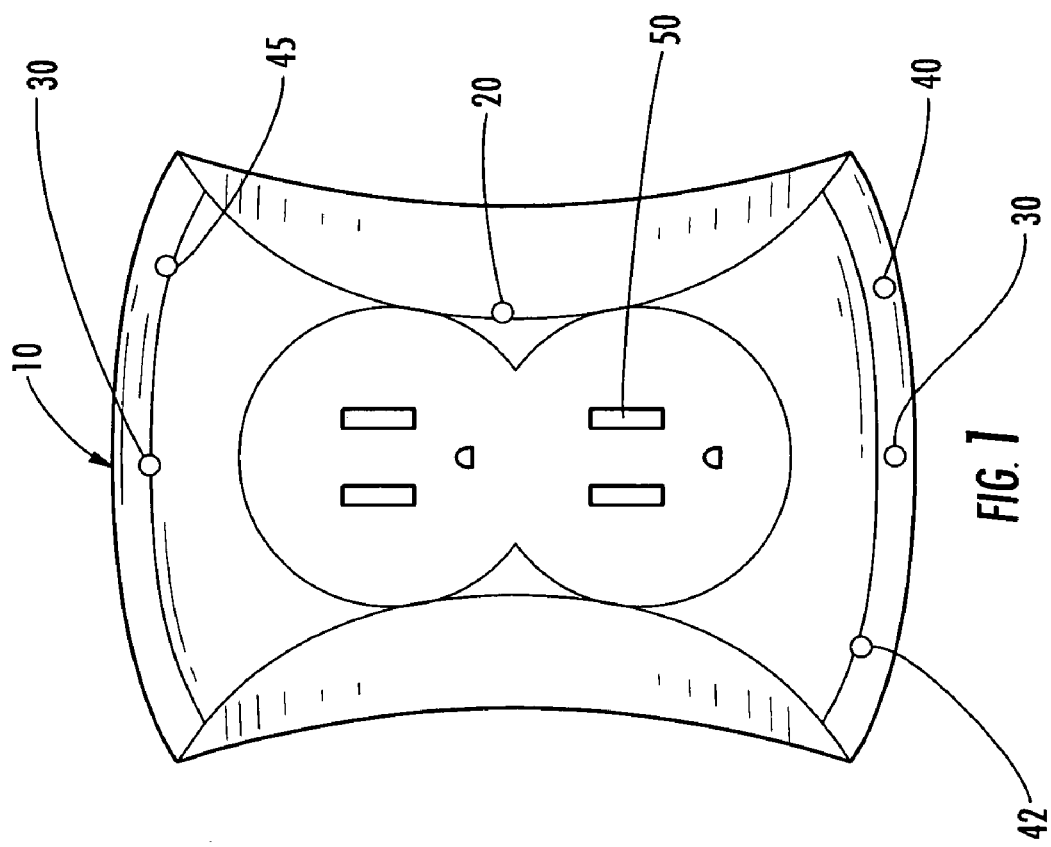
FIG. 1 illustrates a front perspective view an emergency lighting device in accordance with one embodiment of the present invention.

FIGS. 1 and 2 depict front and side perspectives of a lighting device in accordance with one embodiment of the present invention. According to the depicted embodiment, the lighting device 10 includes a main body housing 20 having a plug-through electrical capability for use in combination with a conventional electrical wall outlet (not shown). In one embodiment, the lighting device 10 is simply plugged into the wall outlet after removal of its faceplate. In other embodiments, the faceplate need not be removed as will be apparent to one of ordinary skill in the art. To facilitate this plug-through electrical capability, various embodiments of the device 10 include a plurality of female electrode receptacles 50 and male electrode prongs 55 that are disposed on opposing exterior surfaces of the main body housing 20, as illustrated by FIGS. 1 and 2 respectively. In various embodiments, the lighting device 10 also includes at least one array of light emitting diodes (LEDs) 30, a power sensor 42, a motion sensor 40, and a photo sensor 45 attached to the main body housing 20. These components are provided in electrical communication via corresponding electrical circuitry.

As will be apparent to one of ordinary skill in the art, the male electrode prongs 55 discussed above are configured for insertion into a standard electrical outlet thereby tapping into the main power supply of a building, home or other dwelling. Accordingly, the external plugs of other electrical appliances (not shown) may be inserted into the female electrode receptacles 50 of the lighting device 10, which are electronically connected to the male electrode prongs 55, thereby providing plug-through access to the main power supply for the other electrical appliances. Although depicted in FIGS. 1 and 2 as having a standard United States outlet configuration, the plurality of electrode prongs 55 and corresponding female electrode receptacles 50 may be provided in any configuration currently known in the art, making the present invention useful for grounded, ungrounded, United States or international style outlets. Further, in other embodiments of the invention, the lighting device 10 may serve as an adapter having electrode prongs 55 of one configuration (e.g., standard United States configuration) opposed by female electrode receptacles 50 of another (e.g., standard European configuration).

Various embodiments of the present invention may include a local energy source 25 mounted to the circuit board 35 for providing energy to the array of LEDs 30. In one embodiment, the local energy source 25 may be comprised of an electrochemical device, such as a battery pack. In various other embodiments, other energy sources may supply the electrical energy necessary to operate the lighting device of the present invention. For example, other direct current electrical sources such as solar power may be implemented or alternating current sources may be used. The choice of the electrical energy source will typically be dictated by ease of use, reliability concerns and the desired function (i.e., emergency versus temporary use) of the lighting device.

Figure 3:
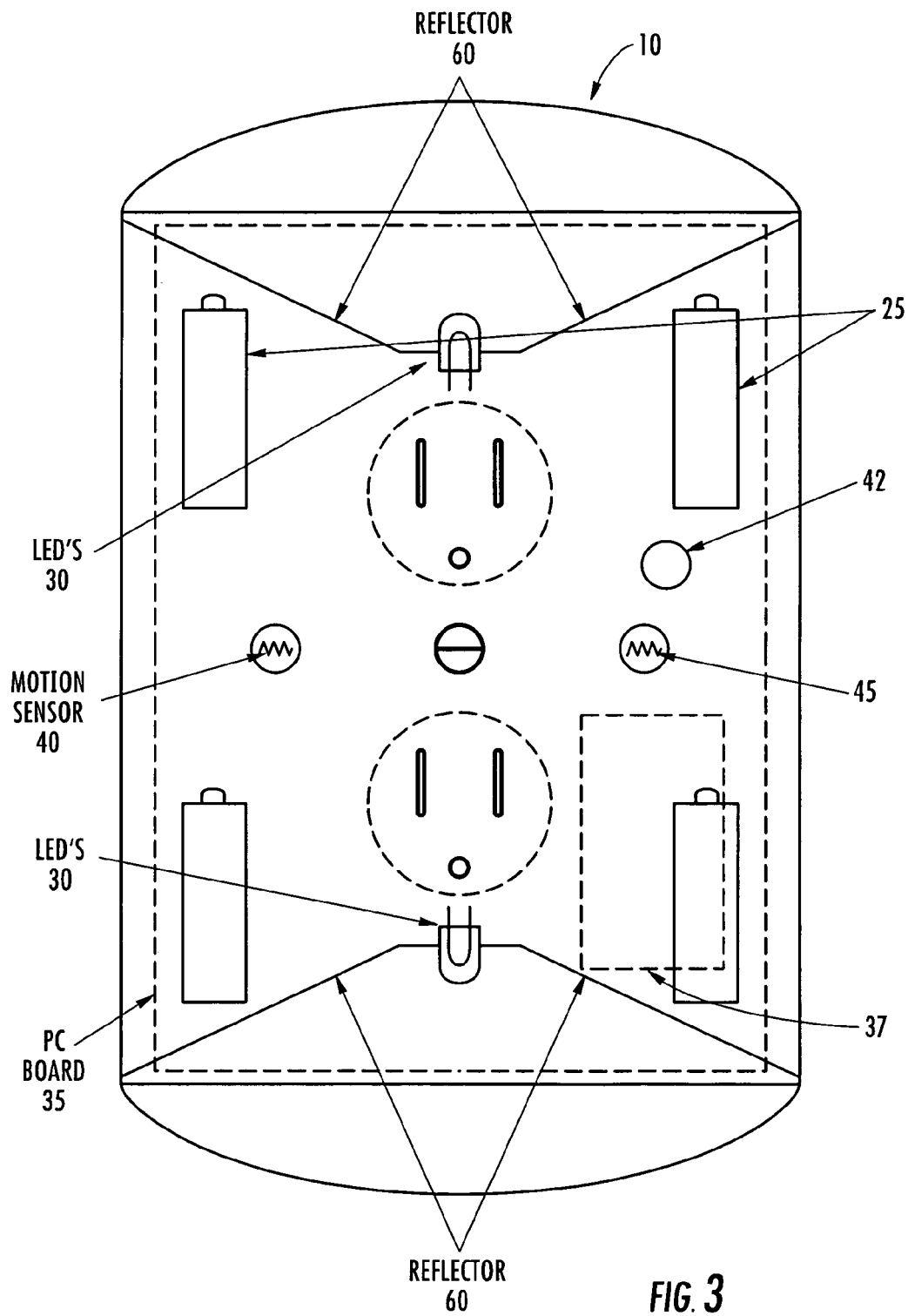
FIG. 3 illustrates a schematic drawing of a front perspective view of an emergency lighting device, in accordance with another embodiment of the present invention.

Referring to FIG. 3, a schematic drawing is provided illustrating a lighting device 10 according to one embodiment of the present invention. According to the depicted embodiment, the lighting device 10 includes an electronic circuit board 35 for supporting and electronically connecting at least one array of LEDs 30, a power sensor 42, a photo sensor 45, and a motion sensor 40. In various embodiments, these sensors combine to provide effective emergency lighting to a darkened room or corridor as described in detail below.

In one embodiment, a control circuit 37 may be provided wherein the power, photo and motion sensors 42, 45, 40 provide inputs to the control circuit 37, which selectively engages the LEDs 30 to operate in either a rest mode, a low level luminance mode, or a high level luminance mode. In various embodiments, the control circuit 37 may include a processor, CPU, chip, or other similar logic employing element (not shown). The photo sensor 145 provides an input to the control circuit 37, for selectively engaging the LEDs 30. According to this embodiment, the photo sensor 45 provides a lit/unlit status signal to the control circuit 37, based upon whether externally provided light is present proximate to the photo sensor 45. If ambient light is sensed, a lit status signal is sent to the control circuit 37, which thereby engages the LEDs 30 to operate in a rest mode, wherein the device 10 lies dormant until the ambient light drops below a selected level. At this nominal level of ambient light, the photo sensor 45 sends an unlit status signal to the control circuit 37, which may engage the LEDs 30 depending upon the additional sensor inputs discussed below.

In another embodiment, a power sensor 42 provides an on/off signal to the control circuit 37, based upon a sensed main power supply disruption. If a main power supply disruption is present, an "off" signal is sent by the power sensor 42 to the control circuit 37, which thereby engages the LEDs 30 to operate in a high level luminance mode or a low level luminance mode depending on motion sensor input as discussed below. The high level luminance mode provides the maximum possible lighting to the darkened room or corridor. At this maximum level, full use of the local energy source 25 is required; thus, in embodiments using battery packs, battery life is exhausted at a maximum rate. Advantageously, however, even at this maximum exhaustion rate, the LEDs 30 of the present invention may consume as much as 90 percent less energy than standard incandescent light bulbs, thereby increasing expected battery life from a few hours to several weeks. If no main power disruption is sensed, an "on" signal is sent by the power sensor 42 to the control circuit 37, and the LEDs 30 remain unengaged in a rest mode pending further input as discussed below.

In another embodiment, a motion sensor 40 provides an active/non-active signal to the control circuit 37 based upon sensed local movement. If local movement is sensed and the main power supply has not been interrupted, an "active" signal is sent by the motion sensor 40 to the control circuit 37, thereby engaging the LEDs 30 into a low level luminance mode. The low level luminance mode provides moderate lighting of the darkened room or corridor. During the low level luminance mode, only a minimum level of battery power is required; thus battery life is exhausted at a minimum rate. If local movement is sensed and the main power supply has been interrupted, the active signal triggers the control circuit 37 to engage the LEDs 30 in the high level luminance mode described above. If no local movement is sensed and the main power supply has been interrupted, a "non-active" signal is sent by the motion sensor 40 to the control circuit 37, thereby engaging the LEDs 30 in the low level luminance mode to conserve battery life. Further discussion in this regard is provided relating to various additional embodiments described below.

In another embodiment, at least one reflector 60 is positioned proximate to the array of LEDs 30 as illustrated in FIG. 3, for reflecting light in desired directions. As such, the geometric relationship between the LED elements 30 and the reflector 60 aids in dispersing the light, resulting in a lighting device 10 that is capable of broadcasting a wide-area blanket of light up appending walls or off of ceilings so as to properly illuminate a darkened room or corridor.

Figure 4:
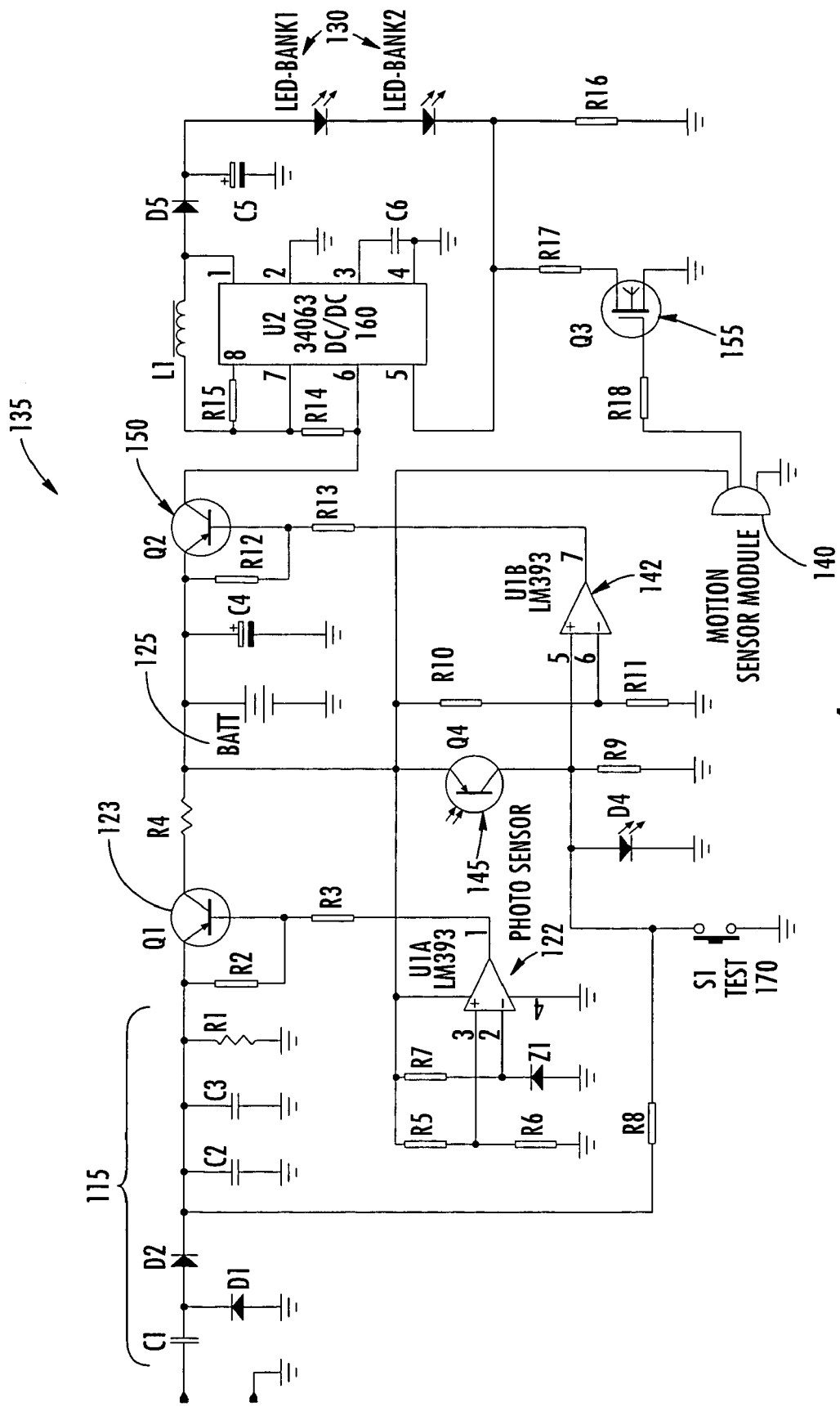
FIG. 4 illustrates an electrical schematic drawing of one embodiment of lighting circuitry, in accordance with the present invention.

FIG. 4 provides a detailed circuit diagram of an electrical circuit board 135 in accordance with another embodiment of the present invention. According to the depicted embodiment, the lighting device includes an electrical circuit comprising an AC/DC converter 115, a power sensor 142, a motion sensor 140, a photo sensor 145, a battery charging control circuit 122, one or more rechargeable batteries 125, one or more LED arrays 130, and a DC/DC constant current supply unit 160. The above components combine to provide emergency lighting functionality by engaging one or more LED arrays between a rest mode, a low level luminance mode, and a high level luminance mode as referenced above.

In the depicted embodiment, the AC/DC converter 115 includes a UL listed high voltage capacitor C1 in addition to diodes D1, D2, capacitors C2, C3, and resistor R1. A switch PNP transistor 123 is provided and controlled by the battery charging control circuit 122. The battery charging control circuit 122 compares a reference voltage provided by a diode Z1 to the voltage supplied by the one or more batteries 125. If the battery voltage is low, the battery charging control circuit 122 sets the switch PNP transistor 123 to a closed status, whereby the batteries are charged. If the battery voltage is not low, the switch PNP transistor 123 is set to an open status and the batteries are not charged.

In one embodiment, the power sensor circuit 142 combines with the photo sensor circuit 145 to control the status of a second switch PNP transistor 150, which functions to turn on/off the at least one array of LEDs 130. In the depicted embodiment, if A/C power is absent and the photo sensor 145 detects a low ambient light condition, the voltage supplied to the power sensor circuit 142 will remain low and, thus, the power sensor circuit 142 closes the second switch PNP transistor 150, thereby engaging the one or more LED arrays. If A/C power is present and/or the photo sensor 145 detects an acceptable ambient light condition, the voltage supplied to the power sensor circuit 142 will remain high and, thus, the power sensor circuit 142 opens switch PNP transistor 150 thereby turning off the one or more arrays of LEDs.

In another embodiment of the present invention, a DC/DC high efficiency converter 160 is provided to supply constant electrical current for driving the one or more LED arrays 130. Additionally, the DC/DC converter 160 helps to maximize illumination time and also ensures that the LED brightness remains generally constant, despite any battery voltage decline experienced during use. In circumstances where brightness control is desired, e.g., to save battery life in non-occupied rooms, a brightness circuit 155 is provided for driving the LEDs arrays 130 between a high level luminance mode and a low level luminance mode. In various embodiments, a motion sensor 140 is provided for controlling the brightness circuit 155. In one embodiment, the motion sensor 140 is a passive infrared motion detector having a Fresnel lens as known in the art. If no motion is provided adjacent the motion sensor 140, the sensor 140 will engage the brightness circuit 155 to operate the LEDs in low luminance mode. If motion is present, the sensor 140 engages the brightness circuit 155 to operate the LEDs in high level luminance mode. Thereafter, if motion proximate the motion sensor 140 ceases, various embodiments may include a timing device as known in the art for triggering the LEDs to return to the low luminance mode after a selected period of time. In this regard, battery life may be maximized. In various other embodiments, one or more test switches 170 may be provided for testing the operation of one or more of the above circuits and/or LED arrays.

Figure 5:
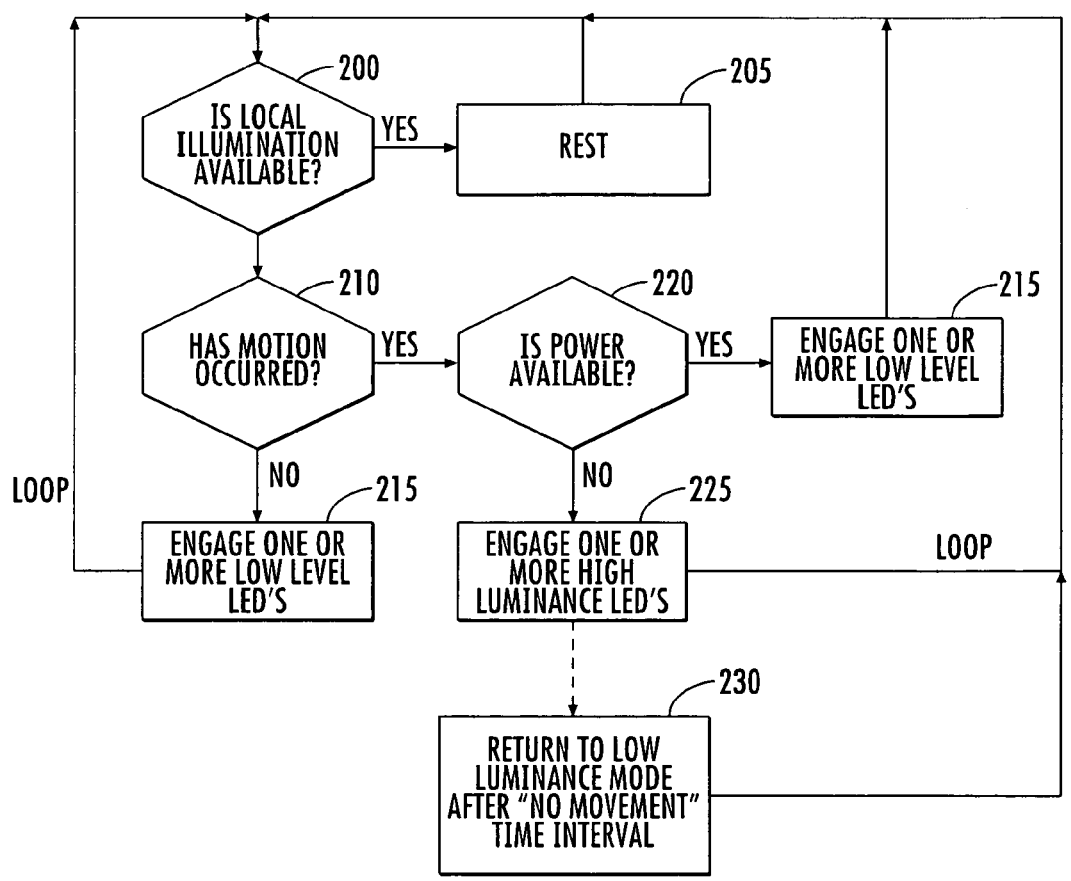
FIG. 5 depicts a flow diagram of a method for implementing an emergency lighting system, responsive to local motion and power disruption in accordance with one embodiment of the present invention.

FIG. 5 illustrates a method for implementing an emergency lighting system having motion and power disruption responsiveness, in accordance with one embodiment of the present invention. The depicted method embodiment also provides nighttime motion sensitivity regardless of the power or motion conditions as described below. According to this embodiment, the method comprises the step of sensing ambient light 200 via a photo sensor to determine whether externally provided lights in a given room or corridor are operating. If external lights are operating or daylight is present, a rest mode step 205 is triggered. If ambient light is not sensed, the method further comprises the step of sensing local movement 210 via the motion sensor. If local movement is not present, a step of engaging the LEDs to operate in a low level luminance mode 215 is triggered, thereby providing nighttime motion sensitive illumination. If local movement is present, the method further comprises the step of sensing a main power supply 220. If the main power supply has been interrupted and local movement is present, a high luminance LED step 225 is triggered. If the main power supply is uninterrupted and local movement is present, the LEDs are engaged to operate in a low level luminance mode 215.

For purposes of further illustration, Tables 1 provided below outline the conditions for illumination according to various embodiments of the invention. In particular, Table 1 outlines the conditions for nighttime sensitive operation in accordance several embodiments of the invention. The presence of ambient light, local motion or external power is illustrated by a check-mark ("✓") and the absence of such conditions is illustrated by a dash ("–").

TABLE 1

| Nighttime Sensitivity Enabled | | | |
|---|---|---|---|
| Motion | Light | Power | Illumination Mode |
| – | – | – | Low level illumination |
| – | – | ✓ | Low level illumination |
| – | ✓ | – | Rest mode |
| – | ✓ | ✓ | Rest mode |
| ✓ | – | – | High level illumination |
| ✓ | – | ✓ | Low level illumination |
| ✓ | ✓ | – | Rest mode |
| ✓ | ✓ | ✓ | Rest mode |

In various other embodiments, the above method may further comprise a step of returning the LEDs to a low level luminance mode 230 after a predetermined "no movement" time interval following step 225 as shown. In this regard, the emergency lighting device preserves battery life when the room or corridor is unoccupied. In alternate embodiments, the lighting device may be placed in electrical communication with one or more smoke detectors such that the above power-down step 225 may be overridden if the room or corridor fills with smoke, thereby potentially disturbing the ability of the motion sensor to detect local movement. Finally, in several embodiments of the present invention, the emergency lighting system is designed to loop so as to repeat the above-described method indefinitely upon activation.

Figure 6:
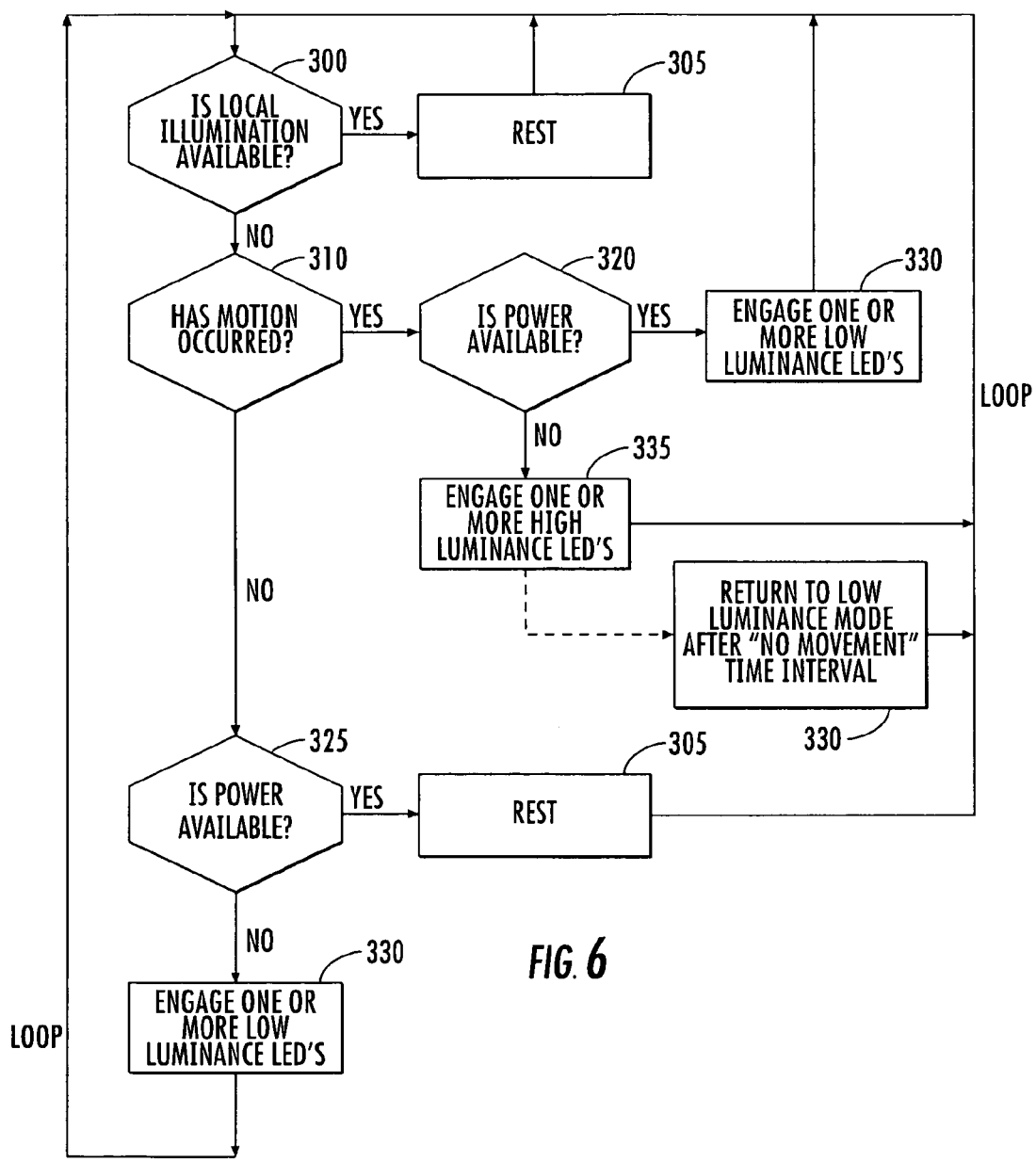
FIG. 6 depicts a flow diagram of another method for implementing an emergency lighting system, responsive to local motion and power disruption in accordance with another embodiment of the present invention.

FIG. 6 illustrates another method for implementing an emergency lighting system having motion and power disruption responsiveness in accordance with another embodiment of the present invention. The embodiment illustrated in FIG. 6 removes the above described nighttime motion sensitivity in order to limit non-emergency power consumption. According to this embodiment, the method comprises the step of sensing ambient light 300 via the photo sensor to determine whether externally provided lights in a given room or corridor are operating. If external lights are operating or daylight is present, a rest mode step 305 is triggered. If ambient light is not sensed, the method further comprises the steps of sensing local movement 310 via the motion sensor. If local movement is present, the method further comprises the step of sensing a main power supply 320. If no local movement is present, a similar step of sensing a main power supply 325 is triggered. If there has been no movement and the main power supply has been interrupted, a low level luminance mode 330 is triggered. A low level luminance mode is also triggered if there has been movement and the main power supply remains uninterrupted. If there has been movement and the main power supply has been interrupted, a high luminance LED step 335 is triggered. Further, if there has been no movement and the main power supply remains available, a rest step 305 is triggered.

For purposes of further illustration, Tables 2 provided below outline the conditions for illumination according to various embodiments of the invention. In particular, Table 2 outlines the illumination conditions for those embodiments wherein nighttime sensitivity has been disabled. The presence of ambient light, local motion or external power is illustrated by a check-mark ("✓") and the absence of such conditions is illustrated by a dash ("–").

TABLE 2

Nighttime Sensitivity Disabled

| Motion | Light | Power | Illumination Mode |
|--------|-------|-------|-------------------|
| –      | –     | –     | Low level illumination |
| –      | –     | ✓     | Low level illumination |
| –      | ✓     | –     | Rest mode |
| –      | ✓     | ✓     | Rest mode |
| ✓      | –     | –     | High level illumination |
| ✓      | –     | ✓     | Rest mode |
| ✓      | ✓     | –     | Rest mode |
| ✓      | ✓     | ✓     | Rest mode |

In various other embodiments, the above method may further comprise a step of returning the LEDs to a low level luminance mode 330 after a predetermined "no movement" time interval following step 335 as shown. In this regard, the emergency lighting device preserves battery life when the room or corridor is unoccupied. In alternate embodiments, the lighting device may be placed in electrical communication with one or more smoke detectors such that the above power-down step 225 may be overridden if the room or corridor fills with smoke, thereby potentially disturbing the ability of the motion sensor to detect local movement. Finally, in several embodiments of the present invention, the emergency lighting system is designed to loop so as to repeat the above-described method indefinitely upon activation The above method steps have been provided in a sequence selected merely for illustration purposes. As will be apparent to one of ordinary skill in the art, alternate sequencing of the steps outlined above are possible without deviating from the inventive concepts set forth above.

Figure 7:
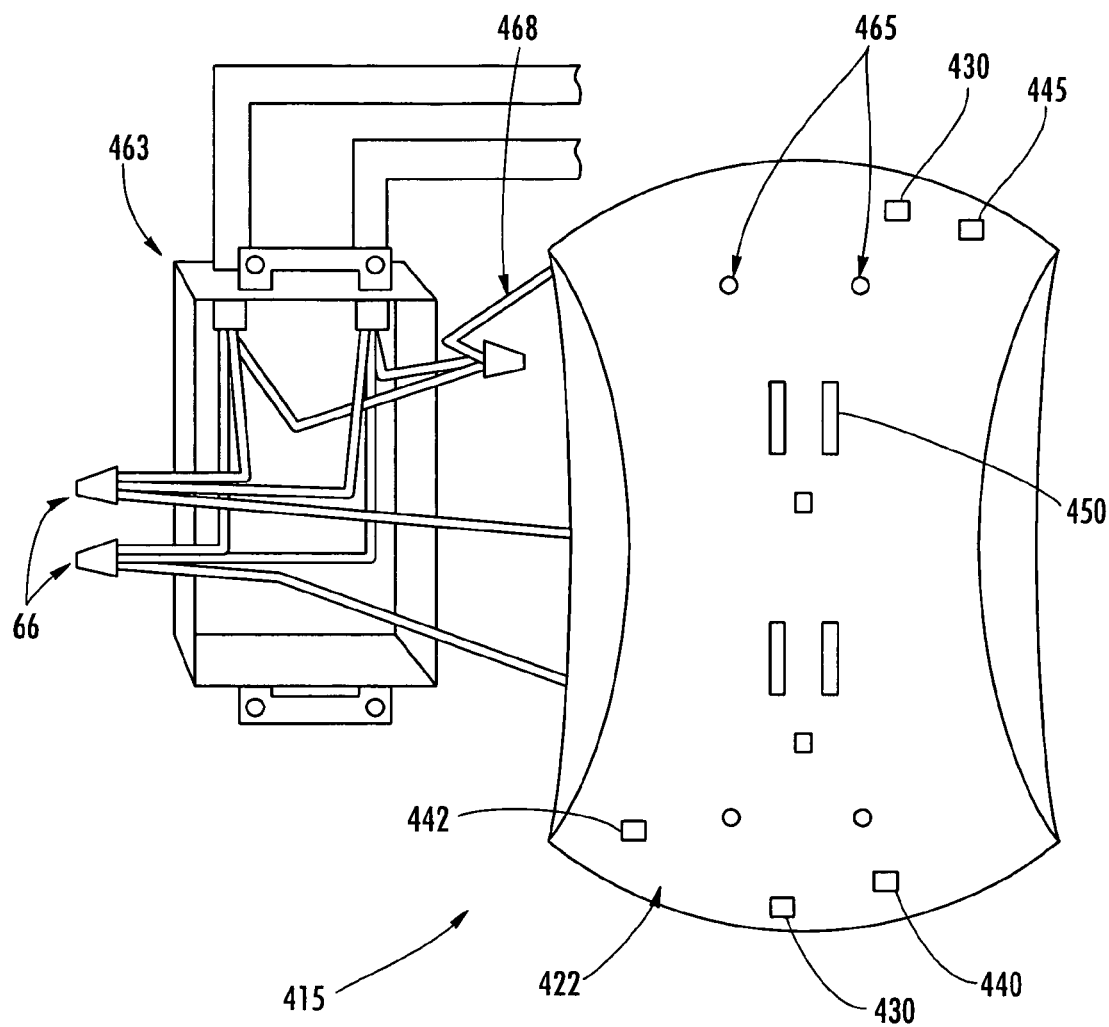
FIG. 7 illustrates a schematic view a dedicated emergency lighting device in accordance with one embodiment of the present invention.

FIG. 7 depicts a schematic view of a lighting device in accordance with yet another embodiment of the present invention. According to the depicted embodiment, the dedicated lighting device 415 includes a main body plate 422 which replaces altogether a conventional electrical wall outlet receptacle (not shown). The dedicated device 415 simply attaches to the power wire 468, ground and neutral wires 466 of a conventional outlet structure 463. Alternatively, a dedicated outlet structure (not shown) may be used that is sized to precisely match the structure of the dedicated device 415. Once the dedicated device 415 has been electrically attached, it is affixed to the outlet structure 463 via attaching fasteners (not shown) that extend through mounting holes 465 in the main body plate 422. As described above, the dedicated device 415 similarly includes a plurality of female electrode receptacles 450 that are disposed on the exterior surface of the main body plate 420, as illustrated in FIGS. 7. The dedicated lighting device 415 further comprises at least one array of light emitting diodes (LEDs) 430, a power sensor 442, a motion sensor 440, and a photo sensor 445 attached to the main body plate 420 as shown. These components are provided in electrical communication via corresponding electrical circuitry.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A wall outlet adapter, comprising:
    an adapter body having female electrode receptacles positioned on an exterior surface and male electrode prongs positioned on an opposing exterior surface, wherein said female electrode receptacles are in electronic communication with said male electrode prongs, said adapter body comprising;
    an array of light emitting diodes (LEDs) in electrical communication with corresponding electrical circuitry,
    a local electrical energy source and a main power supply for supplying electrical energy to said array of LEDs,
    a control circuit in electrical communication with said array of LEDs, said control circuit in further electrical communication with a power sensor for sensing disruptions in said main power supply, a motion sensor for sensing movement proximate to said wall outlet adapter, a photo sensor for sensing ambient light proximate to said wall outlet adapter, wherein said control circuit operatively engages said array of LEDs to illuminate, and
    a reflector positioned proximate to said array of LEDs for reflecting light provided by said LEDs.

2. The wall outlet adapter of claim 1, wherein said power sensor is structured to provide a main power supply-on signal or a main power supply-off signal to said control circuit; said motion sensor is structured to provide a motion present signal or a motion not-present signal to said control circuit; and said photo sensor is structured to provide an ambient light present signal or an ambient light not-present signal to said control circuit;
    wherein said control circuit engages said array of LEDs to operate in a first illumination mode wherein said array of LEDs produce a first luminance output, a second illumination mode wherein said array of LEDs produce a second luminance output, and a rest mode wherein said array of LEDs produce a rest luminance output, wherein said first luminance output is greater than said second luminance output, said second luminance output is greater than said rest luminance output; and
    wherein said control circuit engages said array of LEDs to operate in said first illumination mode upon receiving the main power supply-off signal from said power sensor, the ambient light not-present signal from said photo sensor, and the motion present signal from said motion sensor.

3. The wall outlet adapter of claim 2, wherein said control circuit engages said array of LEDs to operate in said second illumination mode upon receiving the main power supply-off signal from said power sensor, the ambient light not-present signal from said photo sensor, and the motion not-present signal from said motion sensor.

4. The wall outlet adapter of claim 2, wherein said control circuit engages said array of LEDs to operate in said second illumination mode upon receiving the main power supply-on signal from said power sensor, the ambient light not-present signal from said photo sensor, and the motion not-present signal from said motion sensor.

5. The wall outlet adapter of claim 2, wherein said control circuit engages said array of LEDs to operate in said rest mode upon receiving the main power supply-off signal from said power sensor, the ambient light present signal from said photo sensor, and the motion not-present signal from said motion sensor.

6. The wall outlet adapter of claim 2, wherein said control circuit engages said array of LEDs to operate in said rest mode upon receiving the main power supply-on signal from said power sensor, the ambient light present signal from said photo sensor, and the motion not-present signal from said motion sensor.

7. The wall outlet adapter of claim 2, wherein said control circuit engages said array of LEDs to operate in said second illumination mode upon receiving the main power supply-on signal from said power sensor, the ambient light not-present signal from said photo sensor, and the motion present signal from said motion sensor.

8. The wall outlet adapter of claim 2, wherein said control circuit engages said array of LEDs to operate in said rest mode upon receiving the main power supply-off signal from said power sensor, the ambient light present signal from said photo sensor, and the motion present signal from said motion sensor.

9. The wall outlet adapter of claim 2, wherein said control circuit engages said array of LEDs to operate in said rest mode upon receiving the main power supply-on signal from said power sensor, the ambient light present signal from said photo sensor, and the motion present signal from said motion sensor.

10. The wall outlet adapter of claim 2, wherein said control circuit engages said array of LEDs to operate in said rest mode upon receiving the main power supply-on signal from said power sensor, the ambient light not-present signal from said photo sensor, and the motion present signal from said motion sensor.

11. The wall outlet adapter of claim 1, wherein said power sensor is structured to provide a main power supply-on signal or a main power supply-off signal to said control circuit; said motion sensor is structured to provide a motion present signal or a motion not-present signal to said control circuit; and said photo sensor is structured to provide an ambient light present signal or an ambient light not-present signal to said control circuit;

wherein said control circuit engages said array of LEDs to operate in a first illumination mode wherein said array of LEDs draw a first power level from said local energy source, a second illumination mode wherein said array of LEDs draw a second power level from said local energy source, and a rest mode wherein said array of LEDs draw a rest power level from said local energy source, wherein said first power level is greater than said second power level, said second power level is greater than said rest power level; and wherein said control circuit engages said array of LEDs to operate in said first illumination mode upon receiving the main power supply-off signal from said power sensor, the ambient light not-present signal from said photo sensor, and the motion present signal from said motion sensor.

12. The wall outlet adapter of claim 11, wherein said control circuit engages said array of LEDs to operate in said second illumination mode upon receiving the main power supply-off signal from said power sensor, the ambient light not-present signal from said photo sensor, and the motion not-present signal from said motion sensor.

13. The wall outlet adapter of claim 11, wherein said control circuit engages said array of LEDs to operate in said second illumination mode upon receiving the main power supply-on signal from said power sensor, the ambient light not-present signal from said photo sensor, and the motion not-present signal from said motion sensor.

14. The wall outlet adapter of claim 11, wherein said control circuit engages said array of LEDs to operate in said rest mode upon receiving the main power supply-off signal from said power sensor, the ambient light present signal from said photo sensor, and the motion not-present signal from said motion sensor.

15. The wall outlet adapter of claim 11, wherein said control circuit engages said array of LEDs to operate in said rest mode upon receiving the main power supply-on signal from said power sensor, the ambient light present signal from said photo sensor, and the motion not-present signal from said motion sensor.

16. The wall outlet adapter of claim 11, wherein said control circuit engages said array of LEDs to operate in said second illumination mode upon receiving the main power supply-on signal from said power sensor, the ambient light not-present signal from said photo sensor, and the motion present signal from said motion sensor.

17. The wall outlet adapter of claim 11, wherein said control circuit engages said array of LEDs to operate in said rest mode upon receiving the main power supply-off signal from said power sensor, the ambient light present signal from said photo sensor, and the motion present signal from said motion sensor.

18. The wall outlet adapter of claim 11, wherein said control circuit engages said array of LEDs to operate in said rest mode upon receiving the main power supply-on signal from said power sensor, the ambient light not-present signal from said photo sensor, and the motion present signal from said motion sensor.

19. The wall outlet adapter of claim 1, wherein said array of LEDs includes at least two LEDs.

20. A wall outlet receptacle, comprising:
an outlet structure disposed in a wall;
a body plate having female electrode receptacles positioned on an exterior surface, wherein said female electrode receptacles are in electronic communication with said outlet structure, said body plate comprising;
an array of light emitting diodes (LEDs) in electrical communication with corresponding electrical circuitry,
a local electrical energy source and a main power supply for supplying electrical energy to said array of LEDs,
a control circuit in electrical communication with said array of LEDs, said control circuit in further electrical communication with a power sensor for sensing disruptions in said main power supply, a motion sensor for sensing movement proximate to said wall outlet receptacle, a photo sensor for sensing ambient light proximate to said wall outlet receptacle, wherein said control circuit operatively engages said array of LEDs to illuminate, and
a reflector positioned proximate to said array of LEDs for reflecting light provided by said LEDs.

21. The wall outlet receptacle of claim 20, wherein said array of LEDs includes at least two LEDs.

* * * * *